(12) United States Patent
Zhou et al.

(10) Patent No.: US 10,875,594 B2
(45) Date of Patent: Dec. 29, 2020

(54) ANTI-THEFT BATTERY BOX STRUCTURE FOR ELECTRIC BICYCLE

(71) Applicants: Kunhua Zhou, Foshan (CN); Yu Zhou, Foshan (CN)

(72) Inventors: Kunhua Zhou, Foshan (CN); Yu Zhou, Foshan (CN)

(73) Assignee: FOSHAN ZENITH SPORTS CO., LTD, Foshan (CN)

( * ) Notice: Subject to any disclaimer, the term of this patent is extended or adjusted under 35 U.S.C. 154(b) by 277 days.

(21) Appl. No.: 16/188,203

(22) Filed: Nov. 12, 2018

(65) Prior Publication Data
US 2019/0077475 A1 Mar. 14, 2019

(30) Foreign Application Priority Data
Oct. 23, 2018 (CN) ..................... 2018 2 1719595 U

(51) Int. Cl.
| | |
|---|---|
| *B62H 5/00* | (2006.01) |
| *B62M 6/90* | (2010.01) |
| *B62M 6/45* | (2010.01) |
| *B62K 19/36* | (2006.01) |
| *B62K 19/32* | (2006.01) |
| *B62K 19/40* | (2006.01) |
| *E05B 65/00* | (2006.01) |

(52) U.S. Cl.
CPC ............ *B62H 5/001* (2013.01); *B62K 19/32* (2013.01); *B62K 19/36* (2013.01); *B62K 19/40* (2013.01); *B62M 6/45* (2013.01); *B62M 6/90* (2013.01); *B62K 2204/00* (2013.01); *E05B 65/00* (2013.01)

(58) Field of Classification Search
CPC ........ B62H 5/001; B62K 19/40; B62K 19/36; B62K 19/32; B62K 2204/00; B62M 6/90; B62M 6/45; E05B 65/00
USPC ........................................................ 280/288
See application file for complete search history.

(56) References Cited

U.S. PATENT DOCUMENTS

| | | | | |
|---|---|---|---|---|
| 9,611,003 B1* | 4/2017 | Yu | ............................ | B62M 6/90 |
| 2010/0212978 A1* | 8/2010 | Huang | .................... | B62K 23/06 |
| | | | | 180/65.31 |
| 2015/0217833 A1* | 8/2015 | Silva | ....................... | B62M 9/00 |
| | | | | 180/206.4 |

FOREIGN PATENT DOCUMENTS

| | | | |
|---|---|---|---|
| CN | 201124905 Y | * | 10/2008 |
| CN | 203318603 U | * | 12/2013 |

* cited by examiner

*Primary Examiner* — Ruth Ilan
*Assistant Examiner* — Felicia L. Brittman

(57) ABSTRACT

The present invention relates to the field of electric bicycles, and in particular, to an anti-theft battery box structure for an electric bicycle. An external structural shape of the anti-theft battery box structure matches a shape of a top tube of a frame, so that the anti-theft battery box structure and the top tube form a whole to keep the complete appearance of a bicycle. A controller is disposed at a lower end on a rear side of the top tube, and a control box presents an inverted triangle, so that the frame has a more stable structure. In addition, a bolt of a battery lock can enter a lock hole of a battery box, to achieve an anti-theft effect.

6 Claims, 4 Drawing Sheets ated vertically inclined is provided at a front end of the frame, a top tube arranged horizontally is provided in the middle of the frame, a seat tube arranged vertically inclined is provided at a rear end of the frame, a seat stay tilting downwards is further connected between two sides of the rear end of the frame, an inverted-U-shaped battery box installing groove is provided in the middle on an upper side of the top tube, the battery box is clamped in the battery box installing groove and matches the top tube to form a whole, a battery lock used to fix the battery box is disposed on a rear side of the battery box installing groove, a control box used to place the controller is disposed at a lower end on a rear side of the top tube, the control box has an inverted-triangle shape, a bottom bracket is disposed at a lower end of the control box, and a lower side of the bottom bracket is connected to a lower end of the seat tube through a support plate.

ANTI-THEFT BATTERY BOX STRUCTURE FOR ELECTRIC BICYCLE

BACKGROUND OF THE INVENTION

The present invention relates to the field of electric bicycles, and in particular, to an anti-theft battery box structure for an electric bicycle.

In today's society, with the banning of motorcycles and the emission of exhaust gas to pollute the air, electric bicycles have gradually taken the place of motorcycles as a short-distance means of transport for people. Electric bicycles become increasingly popular among consumers. A battery box is a power unit of an electric bicycle, and the installation position and installation structure of the battery box on the electric bicycle have a great impact on the overall performance of the electric bicycle. However, the battery of the electric bicycle is separately installed outside the electric bicycle or is directly installed in a frame. If the battery is installed outside the electric bicycle, it can be stolen easily, and a user needs to buy a lock to lock the battery or carry the battery, which will bring great inconvenience to users' life, and reduce the use experience of the user.

For this, some manufacturers begin to install the battery box inside the frame of the electric bicycle. Although a built-in structure of the battery can well hide the battery assembly and is beneficial to the overall appearance of the electric bicycle to a certain extent, this structure makes the installation and maintenance of the battery extremely inconvenient. On the one hand, a top tube of the frame must be enlarged in its own size in order to accommodate the battery, which is not conducive to the reduction of the production cost. On the other hand, the controller and the battery are both installed on the top tube, which limits the battery length, thus limiting the battery capacity and affecting the overall structural stability of the bicycle. In addition, an excessively long top tube affects the overall structural stability of a bicycle.

BRIEF SUMMARY OF THE INVENTION

To resolve the foregoing problem, the present invention provides an anti-theft battery box structure for an electric bicycle. The anti-theft battery box structure has relatively low costs, desirable stability, and a simple structure, and it is convenient to use the anti-theft battery box structure.

To achieve the foregoing objective, a technical solution used in the present invention is: An anti-theft battery box structure for an electric bicycle includes a battery box, a controller, and a frame, wherein a head tube arranged vertically inclined is provided at a front end of the frame, a top tube arranged horizontally is provided in the middle of the frame, a seat tube arranged vertically inclined is provided at a rear end of the frame, a seat stay tilting downwards is further connected between two sides of the rear end of the frame, an inverted-U-shaped battery box installing groove is provided in the middle on an upper side of the top tube, the battery box is clamped in the battery box installing groove and matches the top tube to form a whole, a battery lock used to fix the battery box is disposed on a rear side of the battery box installing groove, a control box used to place the controller is disposed at a lower end on a rear side of the top tube, the control box has an inverted-triangle shape, a bottom bracket is disposed at a lower end of the control box, and a lower side of the bottom bracket is connected to a lower end of the seat tube through a support plate.

Further, a lock hole is provided at a rear end of the battery box, the battery lock is a telescopic lock, a bolt of the battery lock and the lock hole have corresponding positions, and a keyhole in communication with an outer side of the top tube is provided in the battery lock.

Further, a clamping groove is provided at a front end of the battery box, a corresponding clamping part is disposed at a front end of the battery box installing groove, and the battery box and the battery box installing groove are clamped and fixed through the clamping groove and the clamping part.

Further, the battery box is placed in the battery box installing groove from an upper end, a power interface is disposed at a rear end of the battery box, a controller wiring groove is provided on a lower side of a rear end of the battery box installing groove, and the power interface is electrically connected to the controller wiring groove.

Further, the top tube has a hollow structure, an upper end of the top tube is arc-shaped, the top tube includes an upper cavity and a lower cavity, an area of the upper cavity is greater than that of the lower cavity, and screw fixing portions are disposed on four sides of the upper cavity.

Four screw fixing portions are respectively disposed on four sides inside the upper cavity, and the screw fixing portions are circular rings provided with an opening.

Beneficial effects of the present invention lie in that in the anti-theft battery box structure for the electric bicycle of the present invention, the battery box is installed in the battery box installing groove on the top tube of the frame, thus the battery box and battery box installing groove form a modular installation. The battery lock is used to lock the battery box on the frame, which helps to improve the overall strength of the bicycle. The battery box is conveniently removed or installed vertically in a groove opening direction of the battery box installing groove. After the battery box is installed in position, an external structural shape of the anti-theft battery box structure matches a shape of the top tube of the frame, so that the anti-theft battery box structure and the top tube form a whole to keep the overall appearance of the bicycle. The controller is disposed at a lower end on a rear side of the top tube, and the control box presents an inverted triangle shape. The control box, the top tube, and the seat tube form a triangular frame, which allows the frame to have a more stable structure. In addition, the bolt of the battery lock can enter the lock hole of the battery box to limit vertical movement of the battery box, to achieve an anti-theft effect.

Figure 1:
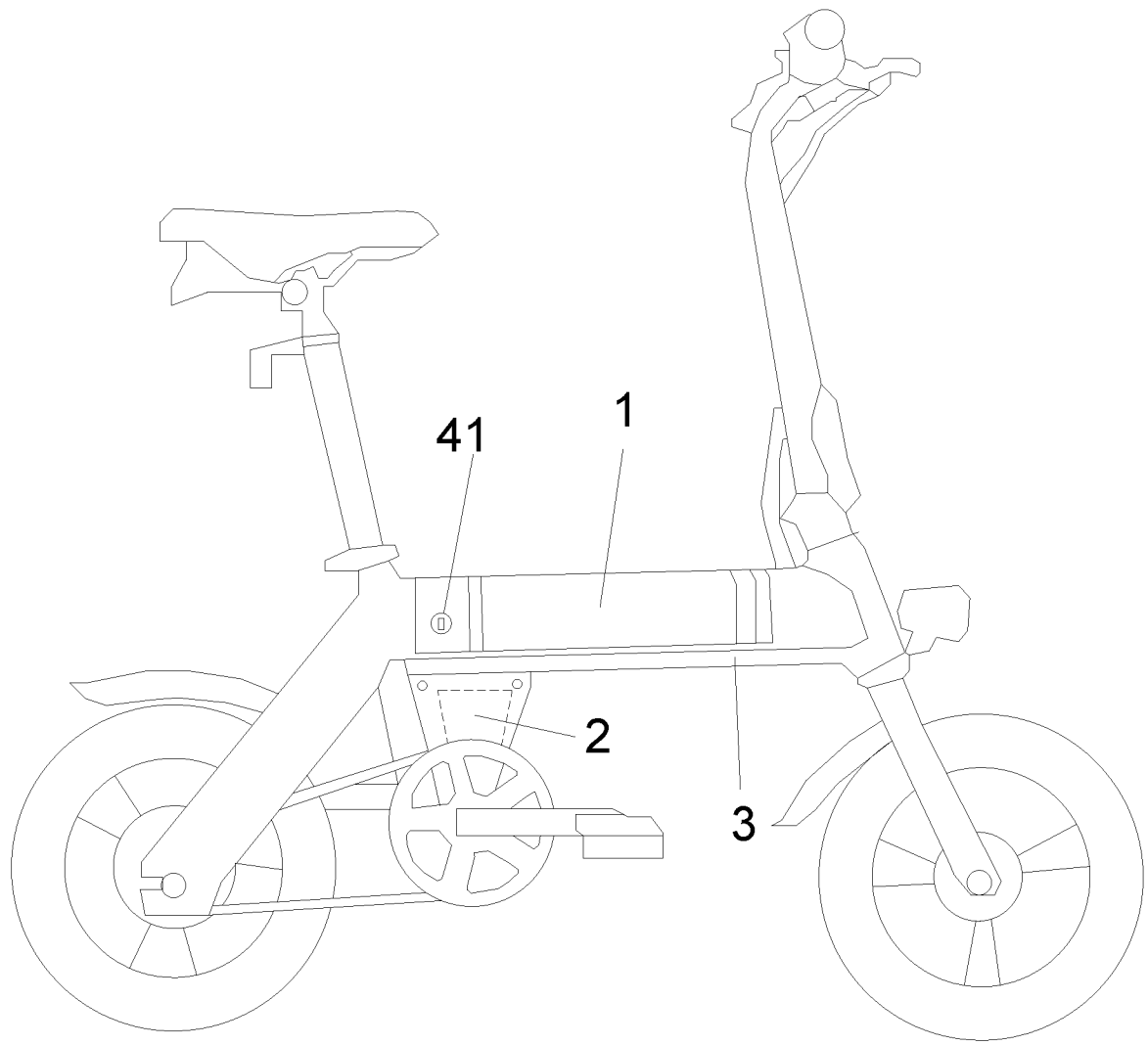
FIG. 1 is a schematic diagram of a position of the present invention on an electric bicycle.
Figure 2:
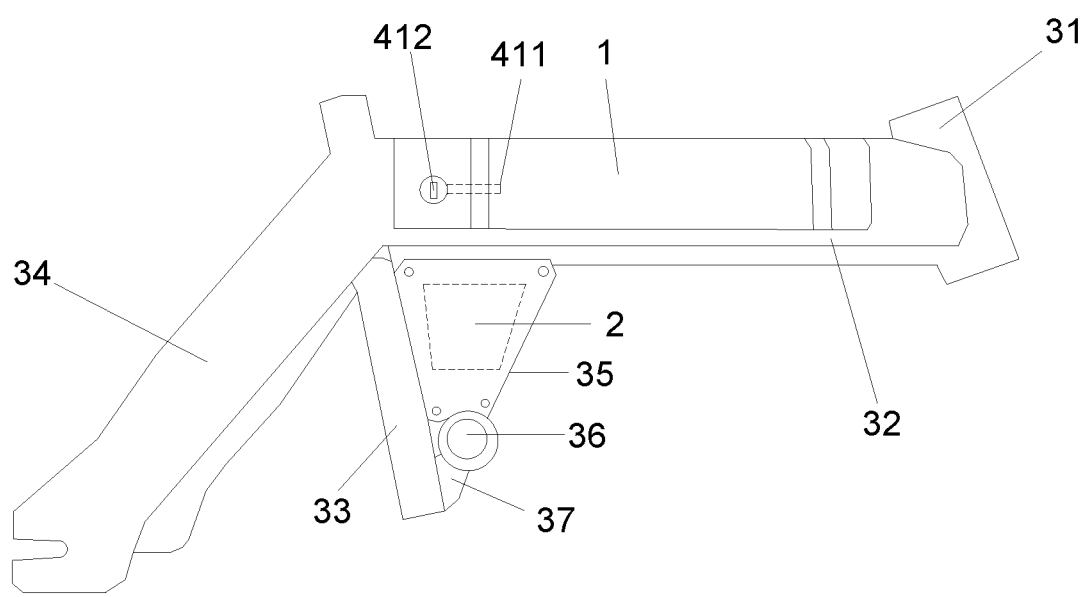
FIG. 2 is a schematic structural diagram according to the present invention.
Figure 3:
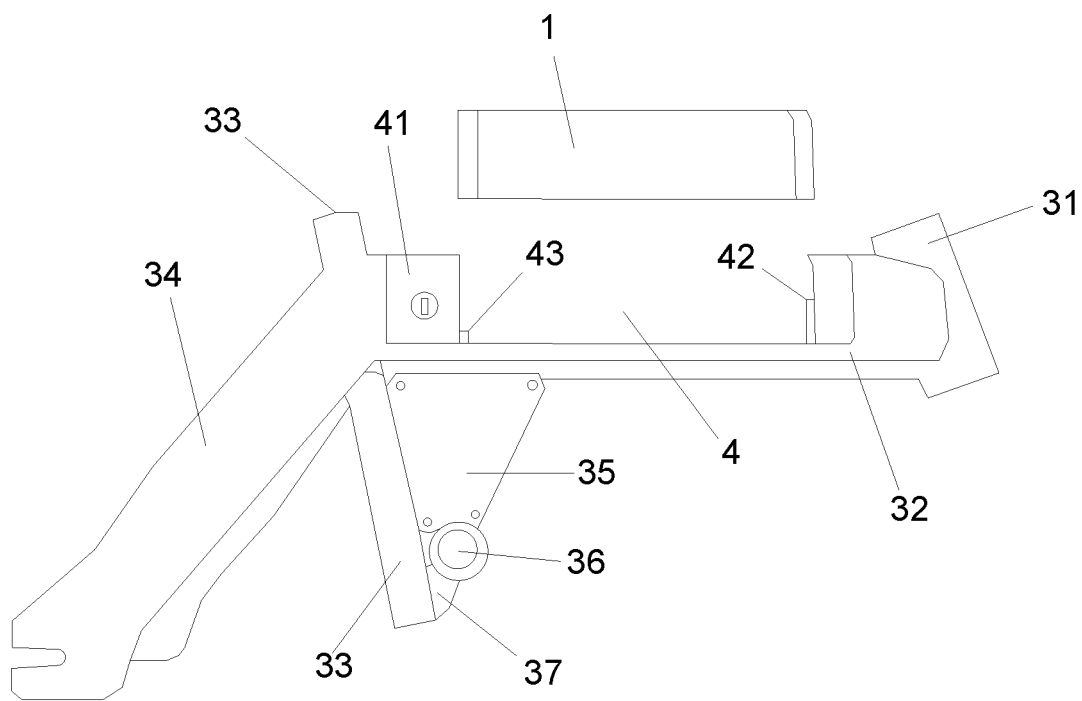
FIG. 3 is another schematic structural diagram according to the present invention.

Description of reference numerals in the drawings: 1. battery box; 11. lock hole; 12. clamping groove; 13. power interface; 2. controller; 3. frame; 31. head tube; 32. top tube; 321. upper cavity; 322. lower cavity; 323. screw fixing portions; 324. protective cover; 33. seat tube; 34. seat stay;

35. control box; 36. bottom bracket; 37. support plate; 4. battery box installing groove; 41. battery lock; 411. bolt; 412. keyhole; 42. clamping part; and 43. controller wiring groove.

DETAILED DESCRIPTION OF THE INVENTION

To make the technical problems resolved by the present invention and the technical solution and beneficial effects of the present invention clearer and more comprehensible, the present invention is further described below in detail with reference to the accompanying drawings and embodiments. It should be understood that the specific embodiments described herein are only used to describe the present invention, rather than to limit the present invention.

Referring to FIG. 1 to FIG. 6, the present invention relates to an anti-theft battery box structure for an electric bicycle, including a battery box 1, a controller 2, and a frame 3. A head tube 31 arranged vertically inclined is provided at a front end of the frame 3. A top tube 32 arranged horizontally is provided in the middle of the frame 3. A seat tube 33 arranged vertically inclined is provided at a rear end of the frame 3. A seat stay 34 tilting downwards is further connected between two sides of the rear end of the frame 3. An inverted-U-shaped battery box installing groove 4 is provided in the middle on an upper side of the top tube 32. The battery box 1 is clamped in the battery box installing groove 4, and matches the top tube 32 to form a whole. A battery lock 41 used to fix the battery box 4 is disposed on a rear side of the battery box installing groove 4. A control box 35 used to place the controller 2 is disposed at a lower end on a rear side of the top tube 32. The control box 35 has an inverted-triangle shape. A bottom bracket 36 is disposed at a lower end of the control box 35. A lower side of the bottom bracket 36 is connected to a lower end of the seat tube 33 through a support plate 37.

Compared with the prior art, in the anti-theft battery box structure for the electric bicycle, the battery box 1 is installed in the battery box installing groove 4 on the top tube 32 of the frame 3, thus the battery box 1 and the battery box installing groove 4 form a modular installation. The battery lock 41 is used to lock the battery box 1 on the frame 3, which helps to improve the overall strength of the bicycle. The battery box 1 is conveniently removed or installed vertically in a groove opening direction of the battery box installing groove 4. After the battery box 1 is installed in position, an external structural shape of the anti-theft battery box structure matches a shape of the top tube 32 of the frame 3, so that the anti-theft battery box structure and the top tube 32 form a whole to keep the overall appearance of a bicycle. The controller 2 is disposed at the lower end on the rear side of the top tube 32, and the control box 35 presents an inverted triangle shape. The control box 35, the top tube 32, and the seat tube 33 form a triangular frame, which allows the frame 3 to have a more stable structure. In addition, a bolt 411 of the battery lock 41 can enter a lock hole 11 of the battery box 1 to limit vertical movement of the battery box 1, to achieve an anti-theft effect.

Further, the lock hole 11 is provided at a rear end of the battery box 1. The battery lock 41 is a telescopic lock. The bolt 411 of the battery lock 41 and the lock hole 11 have corresponding positions. A keyhole 412 in communication with an outer side of the top tube 32 is provided in the battery lock 41.

With the foregoing solution, after the battery box 1 is clamped to the battery box installing groove 4, the bolt 411 of the battery lock 41 can enter the lock hole 11 of the battery box 1 to lock a battery, to achieve an anti-theft effect. In this embodiment, the battery lock 41 uses a key lock, and a key is used to unlock or lock the battery box 1, so as to ensure more effectively that the battery is not stolen.

Further, a clamping groove 12 is provided at a front end of the battery box 1. A corresponding clamping part 42 is disposed at a front end of the battery box installing groove 4. The battery box 1 and the battery box installing groove 4 are clamped and fixed through the clamping groove 12 and the clamping part 42.

With the foregoing solution, the battery box 1 and the battery box installing groove 4 are clamped to limit transverse movement of the battery box 1.

Further, the battery box 1 is placed in the battery box installing groove 4 from an upper end. A power interface 13 is disposed at a rear end of the battery box 1. A controller wiring groove 43 is provided on a lower side of a rear end of the battery box installing groove 4. The power interface 13 is electrically connected to the controller wiring groove 43.

Figure 5:
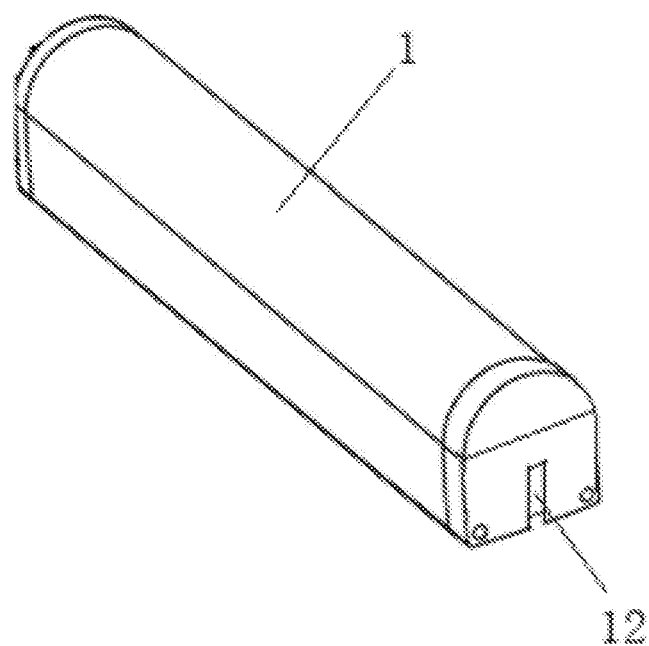
FIG. 5 is a schematic structural diagram of a battery box according to the present invention.
Figure 6:
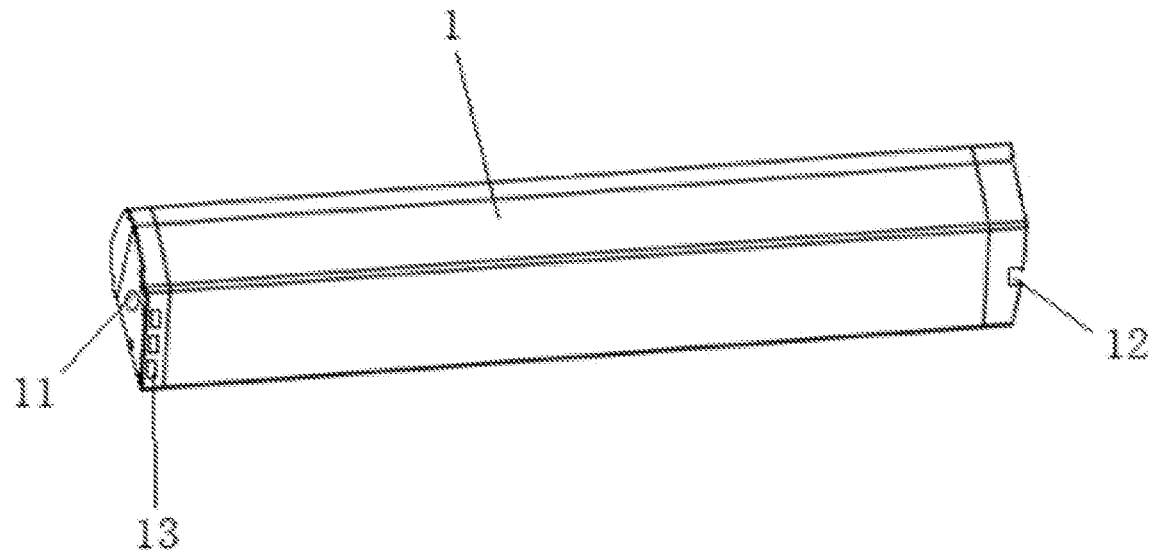
FIG. 6 is another schematic structural diagram of a battery box according to the present invention.

With the foregoing solution, referring to FIG. 5 and FIG. 6, after the battery box 1 is placed in the battery box installing groove 4, the power interface 13 is electrically connected to the controller wiring groove 43. In this embodiment, the power interface 13 of the battery box 1 includes a power output interface and a power input interface. A battery charging interface (not labeled in the figure) connected to the power input interface is further disposed on an outer side of the top tube 32, and a protective cover 324 is disposed on the surface of the battery charging interface. The protective cover 324 and the battery charging interface are clamped and fixed. A user can open the protective cover 324 and connect a charging wire from outside to charge the battery in the battery box 1.

Figure 4:
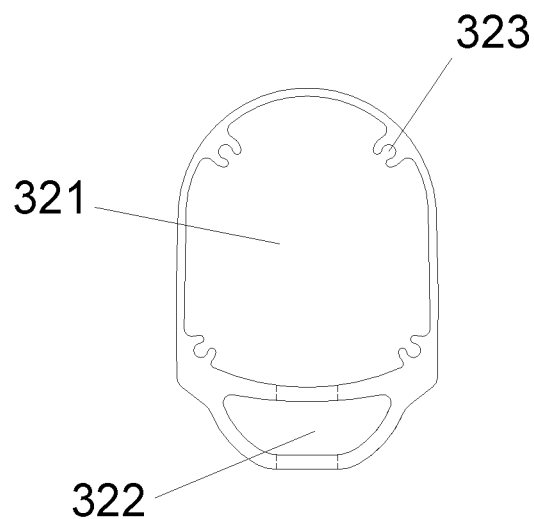
FIG. 4 is a sectional view of a top tube of the present invention.

Further, referring to FIG. 4, the top tube 32 has a hollow structure. An upper end of the top tube 32 is arc-shaped. The top tube 32 includes an upper cavity 321 and a lower cavity 322. An area of the upper cavity 321 is greater than that of the lower cavity 322. Screw fixing portions 323 are disposed on four sides of the upper cavity 321.

With the foregoing solution, the upper cavity 321 in the top tube 32 can be used to install a circuit board and the battery lock 41, and the lower cavity 322 may be used as a wire arranging groove that is used to arrange electrical wires of the bicycle and conceal the electrical wires, so that the overall aesthetic appearance of the bicycle is maintained. In this embodiment, four screw fixing portions 323 are respectively disposed on four sides inside the upper cavity 321. The screw fixing portions 323 are circular rings provided with an opening.

The foregoing implementations are merely description of preferred implementations of the present invention and are not intended to limit the scope of the present invention. Various variations and improvements made to the technical solution of the present invention by a person of ordinary skill in the art without departing from the design and spirit of the present invention shall all fall within the protection scope defined by the claims of the present invention.

What is claimed is:

1. An anti-theft battery box structure for an electric bicycle, comprising a battery box, a controller, and a frame, wherein a head tube arranged vertically inclined is provided at a front end of the frame, a top tube arranged horizontally is provided in the middle of the frame, a seat tube arranged vertically inclined is provided at a rear end of the frame, a seat stay tilting downwards is further connected between two sides of the rear end of the frame, an inverted-U-shaped battery box installing groove is provided in the middle on an upper side of the top tube, the battery box is clamped in the battery box installing groove and matches the top tube to form a whole, a battery lock used to fix the battery box is disposed on a rear side of the battery box installing groove, a control box used to place the controller is disposed at a lower end on a rear side of the top tube, the control box has an inverted-triangle shape, a bottom bracket is disposed at a lower end of the control box, and a lower side of the bottom bracket is connected to a lower end of the seat tube through a support plate.

2. The anti-theft battery box structure for the electric bicycle according to claim 1, wherein a lock hole is provided at a rear end of the battery box, the battery lock is a telescopic lock, a bolt of the battery lock and the lock hole have corresponding positions, and a keyhole in communication with an outer side of the top tube is provided in the battery lock.

3. The anti-theft battery box structure for the electric bicycle according to claim 1, wherein a clamping groove is provided at a front end of the battery box, a corresponding clamping part is disposed at a front end of the battery box installing groove, and the battery box and the battery box installing groove are clamped and fixed through the clamping groove and the clamping part.

4. The anti-theft battery box structure for the electric bicycle according to claim 1, wherein the battery box is placed in the battery box installing groove from an upper end, a power interface is disposed at a rear end of the battery box, a controller wiring groove is provided on a lower side of a rear end of the battery box installing groove, and the power interface is electrically connected to the controller wiring groove.

5. The anti-theft battery box structure for the electric bicycle according to claim 1, wherein the top tube has a hollow structure, an upper end of the top tube is arc-shaped, the top tube comprises an upper cavity and a lower cavity, an area of the upper cavity is greater than that of the lower cavity, and screw fixing portions are disposed on four sides of the upper cavity.

6. The anti-theft battery box structure for the electric bicycle according to claim 5, wherein four screw fixing portions are respectively disposed on four sides inside the upper cavity, and the screw fixing portions are circular rings provided with an opening.

\* \* \* \* \*